UNITED STATES PATENT OFFICE.

HENRY A. H. MASON, OF DENTON, MARYLAND.

ARTIFICIAL STONE.

SPECIFICATION forming part of Letters Patent No. 232,287, dated September 14, 1880.

Application filed February 5, 1880.

*To all whom it may concern:*

Be it known that I, HENRY A. H. MASON, of Denton, in the county of Caroline and State of Maryland, have invented certain new and useful Improvements in Artificial Stone; and I do hereby declare that the following is a full, clear, and exact description of the invention, which will enable others skilled in the art to which it appertains to make and use the same.

This invention relates to the manufacture of artificial stone from the varieties of clay known as "fuller's earth," as will be hereinafter described, and particularly pointed out in the claim.

In carrying out my invention the said fuller's earth (of which several varieties may, when desired, be used in combination) should first be cured by the evaporation of moisture. When dry it is subjected to a bath of linseed-oil, pine-wax, or other oleaginous matter. When fully saturated the article is taken from the bath, drained, and exposed to the air until sufficiently hardened. It is then treated to a solution of silicate of soda of any desired temperature, either in bath or by application, and again exposed to the atmosphere until quite dry. The oleaginous bath is now repeated, as well as the treatment with silicate of soda, the article being each time permitted to dry by exposure to the atmosphere. Finally the article is treated to repeated baths of water to which carbonate of ammonia, liquid ammonia, or sal-ammonia in suitable quantity has been added.

By this treatment the article, when dry, will be found to have acquired the hardness and durability of natural stone.

Having thus described my invention, I claim and desire to secure by Letters Patent of the United States—

As an article of manufacture, artificial stone consisting of fuller's earth treated with linseed-oil or its equivalent, silicate of soda, and ammoniated baths, as and for the purpose set forth.

In testimony that I claim the foregoing as my own I have hereto affixed my signature in presence of two witnesses.

HENRY A. H. MASON.

Witnesses:
THOS. A. SMITH,
JAMES E. HIGNUTT.